United States Patent [19]

Matlock

[11] Patent Number: 4,895,302
[45] Date of Patent: Jan. 23, 1990

[54] TIE PLATE RAIL FASTENING SYSTEM

[76] Inventor: Gordon E. Matlock, 554 Sappington Bridge Rd., Sullivan, Mo. 63080

[21] Appl. No.: 292,549

[22] Filed: Dec. 27, 1988

Related U.S. Application Data

[63] Continuation-in-part of Ser. No. 98,688, Sep. 21, 1987, Pat. No. 4,828,172.

[51] Int. Cl.$^4$ ............................................. E01B 13/02
[52] U.S. Cl. ................................................... 238/298
[58] Field of Search ............... 338/287, 288, 297, 298, 338/303, 306, 310, 315, 321, 335, 338, 343, 366, 367, 368, 371, 372, 373, 375, 377; 411/178, 180, 338, 339

[56] References Cited

U.S. PATENT DOCUMENTS

| | | | |
|---|---|---|---|
| 556,348 | 3/1896 | Harris | 238/298 |
| 560,497 | 5/1896 | Harris | 238/298 |
| 566,828 | 9/1896 | Weed | 238/298 |
| 603,563 | 5/1898 | Harris | 238/294 |
| 649,629 | 5/1900 | Charlton | 238/306 X |
| 682,895 | 9/1901 | Ward | 238/298 |
| 811,262 | 1/1906 | Walling | 238/288 |
| 836,425 | 11/1906 | Woodcock | 238/298 |
| 870,255 | 11/1907 | Smith | 238/89 |
| 912,731 | 2/1909 | Riegler | 238/377 |
| 919,757 | 4/1909 | Peaslee | 238/288 |
| 943,198 | 12/1909 | McDonald | 238/297 |
| 1,029,628 | 6/1912 | Peterson | 238/89 |
| 1,046,575 | 12/1912 | Fenstermacher et al. | 238/377 |
| 1,081,702 | 12/1913 | Schomer | 238/265 |
| 1,132,827 | 3/1915 | Busch | 238/303 |
| 1,156,095 | 10/1915 | Perkins | 238/102 |
| 1,318,640 | 10/1919 | Bergeron | 238/298 |
| 1,404,076 | 1/1922 | Van Zile | 238/292 |
| 1,644,018 | 10/1927 | Hull | 411/338 X |
| 1,834,256 | 12/1931 | Ruping | 238/303 |
| 2,822,986 | 2/1958 | Schreier | 238/377 |
| 2,875,954 | 3/1959 | Appleton | 238/335 X |
| 3,581,990 | 6/1971 | Kirik | 238/283 |
| 3,987,962 | 10/1976 | Robbins | 238/287 |

FOREIGN PATENT DOCUMENTS

| | | | |
|---|---|---|---|
| 302041 | 11/1917 | Fed. Rep. of Germany | 238/297 |
| 786852 | 9/1935 | France | 238/377 |
| 43573 | 11/1908 | Switzerland | 411/338 |
| 377513 | 6/1964 | Switzerland | 238/377 |

Primary Examiner—Duane A. Reger
Attorney, Agent, or Firm—Zarley, McKee, Thomte, Voorhees & Sease

[57] ABSTRACT

A tie plate rail fastening system for securing rails to wood cross-ties is described comprising a wear plate positioned on the upper surface of each of the cross-ties adjacent the ends thereof. The wear plate has a plurality of teeth extending downwardly therefrom which are embedded in the tie to bond the wear plate to the tie. Each of the wear plates has a plurality of tubular members which extend downwardly therefrom and which are received by openings in the cross-tie. Various embodiments are illustrated and described for securing the tubular members to the cross-ties.

11 Claims, 5 Drawing Sheets

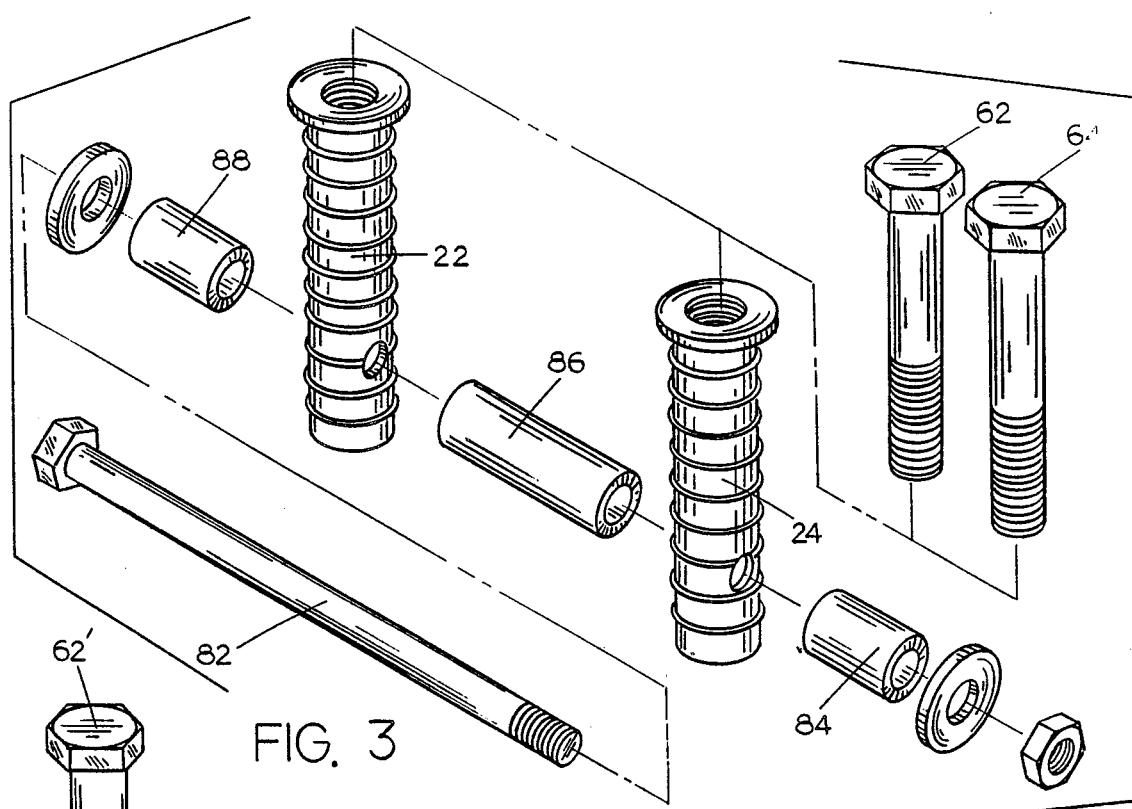
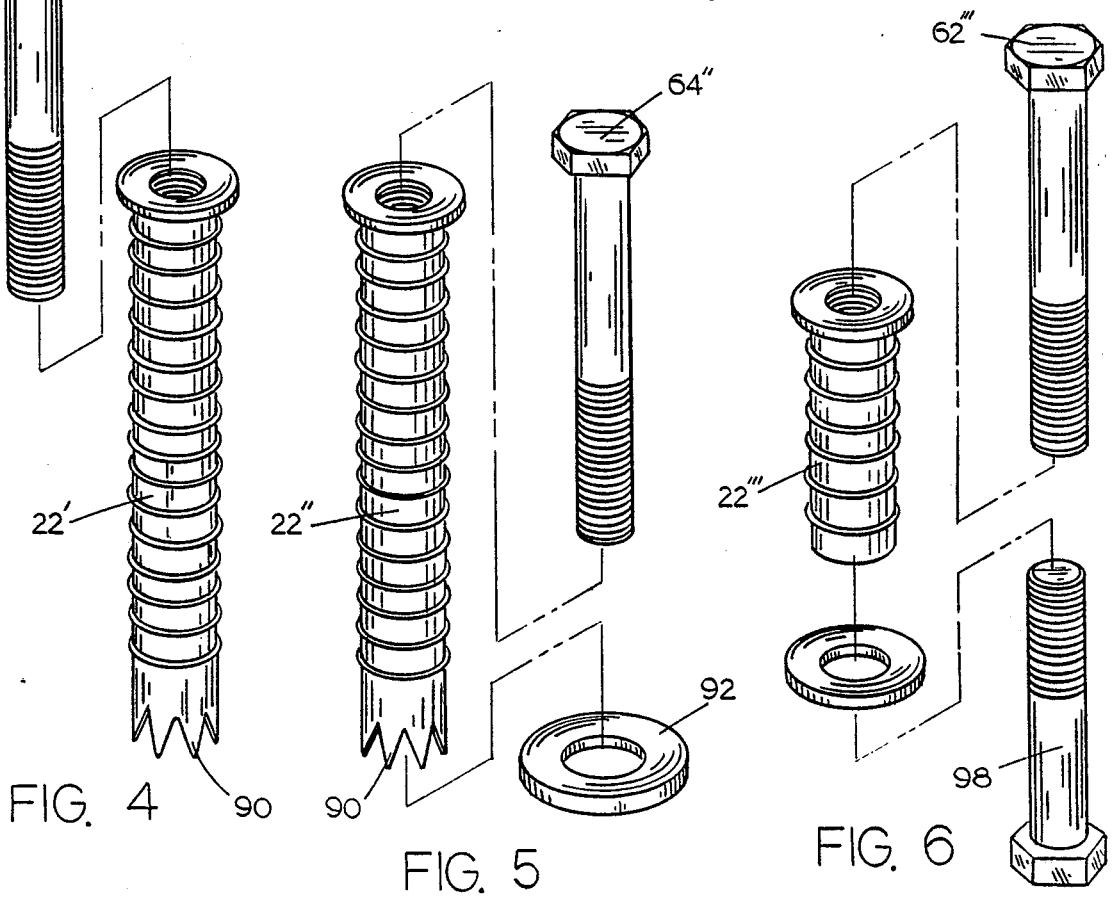

TIE PLATE RAIL FASTENING SYSTEM

CROSS-REFERENCE TO RELATED APPLICATION

This is a continuation-in-part application of Serial No. 98,688 filed Sept. 21, 1987, now U.S. Pat. No. 4,828,172, entitled "Tie Plate Rail Fastening System."

BACKGROUND OF THE INVENTION

In the construction of railroad tracks, wood cross-ties are positioned on the roadbed and normally have a pair of spaced-apart tie plates mounted on the upper surface thereof which support the rails. Normally, spikes are driven downwardly through openings formed in the tie plate into the cross-tie to maintain the tie plate thereon. Additionally, spikes are normally driven through openings formed in the tie plate downwardly into the cross-tie with the head of the spike engaging a portion of the rail to hold the rail on the tie plate. However, in severe service applications, the spikes tend to loosen.

The invention disclosed in the co-pending application represented an improvement in the art and provided a rail fastening system which not only included means for securing a tie plate to a wood cross-tie but which also included means for securing the rails to the tie plate.

It is therefore a principal object of the invention to provide an improved rail fastening system for severe service application.

A further object of the invention is to provide an improved rail fastening system for severe service application including a wear plate which is bonded to the tie by means of a plurality of teeth extending downwardly from the wear plate into the tie.

These and other objects will be apparent to those skilled in the art.

BRIEF DESCRIPTION OF THE DRAWINGS

FIG. 3 is an exploded perspective view of one form of the invention:

FIG. 4 is an exploded perspective view of yet another embodiment:

FIG. 5 is an exploded perspective view of still another embodiment of the invention:

FIG. 6 is an exploded perspective view of yet another embodiment of the invention:

SUMMARY OF THE INVENTION

Figure 1:
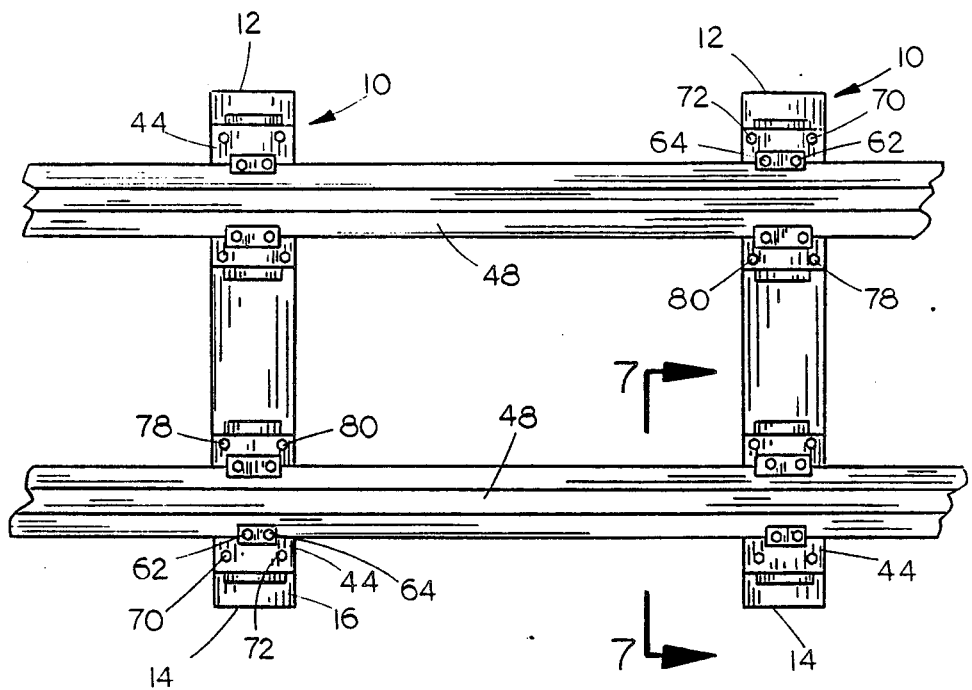
FIG. 1 is a top plan view of a tie plate rail fastening system of this invention being utilized to fasten a pair of rails.
Figure 2:
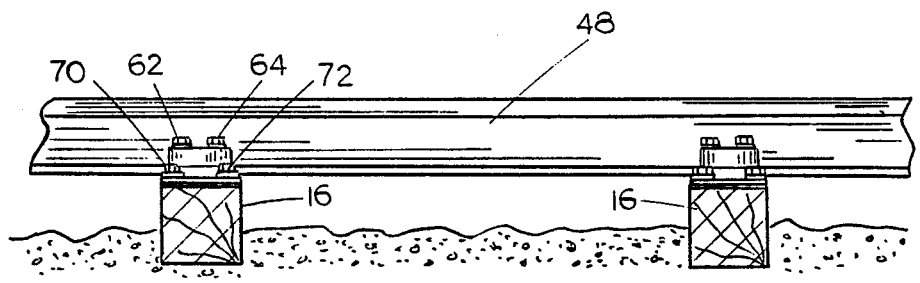
FIG. 2 is a sectional view seen on lines 2—2 of FIG. 1.

A tie plate rail fastening system is provided for securing the rails to wood cross-ties. A wear plate is positioned on the upper surface of each of the cross-ties adjacent each end thereof. The wear plate has several hundred teeth extending downwardly therefrom which are embedded in the tie to bond the wear plate to the tie. Each of the wear plates has a plurality of tubular members secured thereto which extend downwardly therefrom and which are received by openings formed in the cross-tie. Each of the tubular members has an internally threaded portion at the upper end adapted to threadably receive a bolt member. A tie plate is positioned on the wear plate and bolt members extend downwardly through the openings in the tie plate for threadable attachment to the internally threaded portions on the tubular members A pair of rail hold-downs are positioned on opposite sides of each of the rails and have bolt members extending downwardly therethrough which are also threadably received by tubular members. In one form of the invention, the tubular members are secured to the cross-tie by means of a horizontally disposed pin or bolt which extends through the tie and through at least one of the tubular members. In another embodiment of the invention, tubular members are secured to the tie by rolling or crimping the lower ends thereof upwardly into engagement with the tie. In still another embodiment of the invention, a metal washer is provided between the crimped lower end of the tubular member and the tie. In still another form of the invention, bolt members extend upwardly from the bottom of the tie and are threadably received by the tubular members. In still another form of the invention, a modified top wear plate is provided with the wear plate having a wing portion with teeth set at an angle provided thereon so that the wing portions may be driven into the sides of the tie. In still another embodiment, a bottom wear plate is provided with the wear plate having pre-drilled openings formed therein to permit the anchoring tubes to pass therethrough.

DESCRIPTION OF THE PREFERRED EMBODIMENT

In the drawings, the numeral 10 refers to a wooden cross-tie having opposite ends 12 and 14, and upper surface 16. It is recommended that each end of the tie 10 be end plated by means of an end plate 17, although the end plates do not form an integral part of the invention.

The numeral 18 refers to a wear plate having a plurality of spaced-apart teeth 20 extending downwardly therefrom. A wear plate 18 is secured to cross-tie 10 inwardly of each of the ends thereof. Each of the wear plates 18 acts as a barrier support surface plate and requires in excess of 25,000 pounds pressure to seat the approximately 336 teeth 20 into the tie 10. This means there is required at least 25,000 pounds pressure or force to push the wear plate deeper into the tie from the wheel loading of the cars passing thereover thus providing a steel barrier support surface on top of the tie. Such is advantageous for prolonging the service life of the wood cross-tie as it prevents "plate kill" from the common tie plate as it is normally used when spiked directly to the tie. Rail vibration, out-of-round wheels and heavy loading of boxcars cause the tie plate to wear down into the tie thus creating the "plate kill". It should also be noted that approximately 25,000 pounds pressure or force is required to pull the wear plate 18 from the tie. Each of the wear plates 18 shown herein has eight tubular members 22, 24, 26, 28, 30, 32, 34 and 36 (some of which are not shown in the drawings) secured thereto and extending downwardly therefrom which register with openings formed in the wear plate. In some situations, only six tubular members will be employed as, for example, when the tie plate only has six openings formed therein. Inasmuch as each of the tubular members are identical, only tubular member 22 will be described in detail.

The upper ends of each of the tubular members are welded to the underside of the wear plate 18 and are provided with an internally threaded portion 38 adjacent the upper end thereof adapted to threadably receive a bolt member as will be described in more detail hereinafter. Each of the tubular members is provided with a plurality of vertically spaced-apart ridges or teeth 40 which are adapted to engage the cross-tie as indicated to further resist the movement of the tubular member with respect to the tie.

The cross-tie 10 is provided with eight openings (six in some cases) referred to generally by the reference numeral 42 which are adapted to receive the tubular members 22, 24, 26, 28, 30, 32, 34 and 36.

The numeral 44 refers to a tie plate having eight openings (six in some cases) formed therein which register with the tubular members such as 22, 24 respectively. Tie plate 44 is provided with a central recessed area 46 adapted to receive the lower end of rail 48. Rail 48 is secured to tie plate 44 by a pair of rail hold-down members 5 and 52. Inasmuch as members 50 and 52 are identical, except for length, only member 50 will be described in detail. Hold-down member 50 includes a substantially horizontally disposed upper portion 54 having an outer end portion 56 which extends downwardly therefrom as seen in the drawings. A pair of steel tips 60 are embedded in the hold-down member 50 adjacent the inner end thereof and are adapted to engage the rail as seen in the drawings. Bolt members 62 and 64 extend downwardly through openings 66 and 68 formed in hold-down member 50, through openings formed in tie plate 44, through openings formed in tie plate 44, through openings in wear plate 18 and into corresponding tubular members. The lower ends of bolt members 62 and 64 are threadably received by the internally threaded portions 38 in the associated tubular members. Tightening of the bolt members 62 and 64 not only secures the rail to the tie plate but secures the rail and tie plate to the cross-tie.

Bolt members 70 and 72 are extended downwardly through openings in tie plate 40 and are threadably received by the internally threaded portion of corresponding tubular member. Tightening of bolt members 70 and 72 secures the tie plate 40 to the associated tubular members and thus to the cross-tie.

Bolt members 78 and 80 extend downwardly through tie plate 44, through wear plate 18 and are threadably received by the tubular members 30 and 32 respectively.

Figure 7:
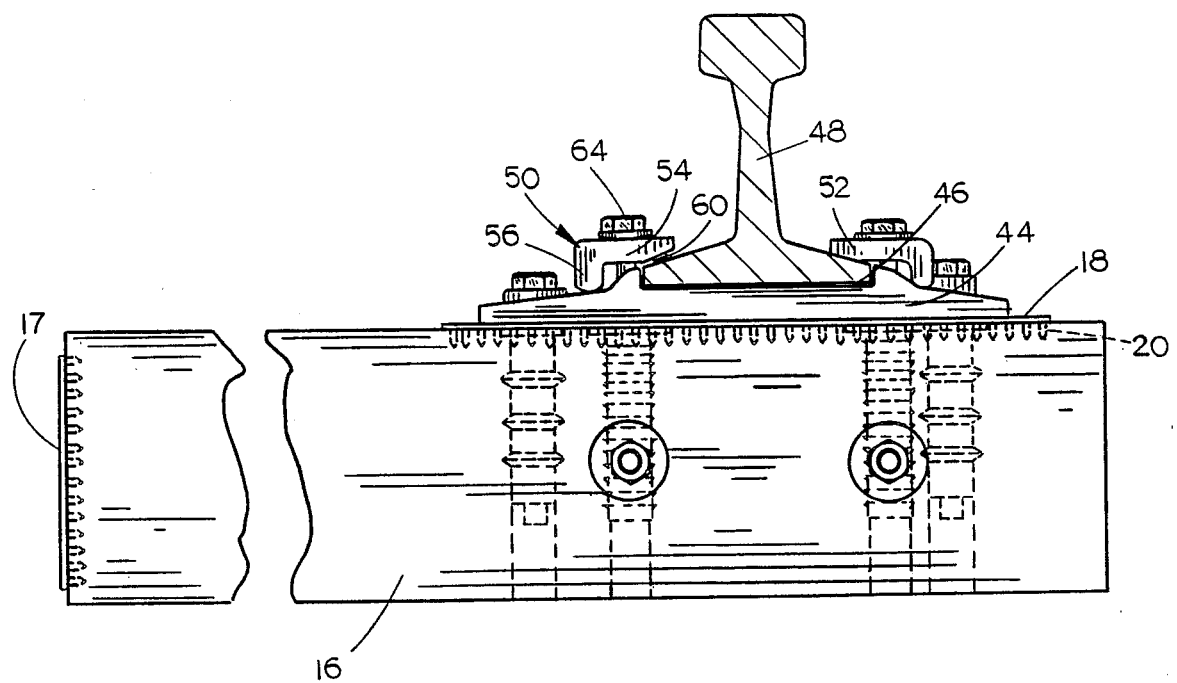
FIG. 7 is a sectional view seen on lines 7—7 of FIG. 1.
Figure 8:
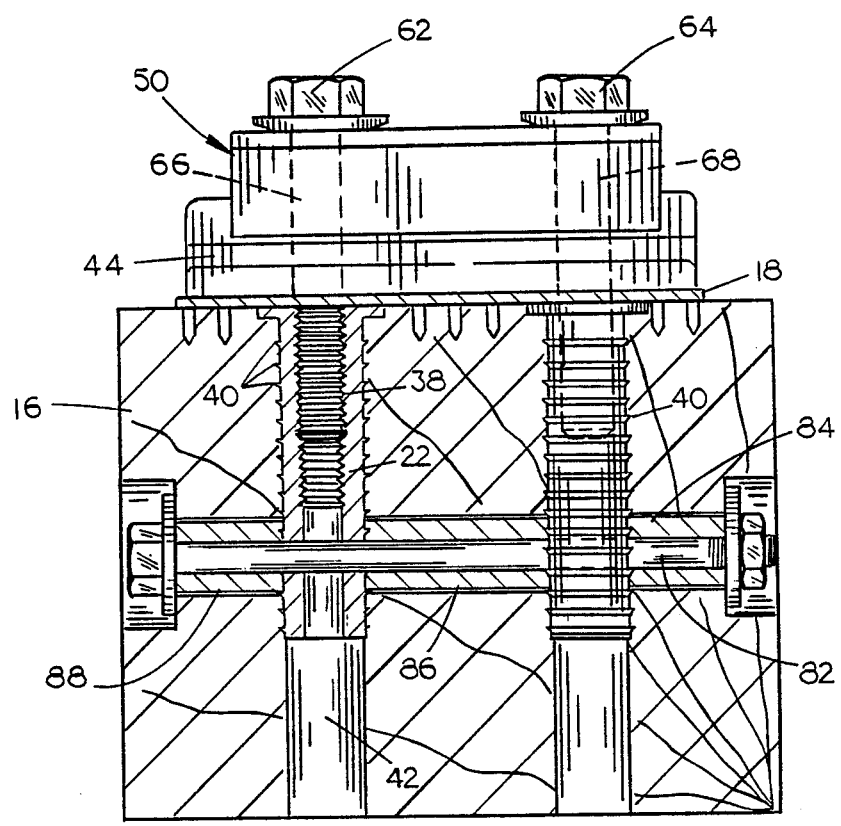
FIG. 8 is a sectional view taken transversely to the view in FIG. 7.

To further secure the tie plate and the rail to the cross-tie, a plurality of bolt members 82 extend horizontally through the tie as illustrated in FIGS. 7 and 8 and extend through openings formed in the tubular members. If desired, spacer stand-off tubes 84, 86 and 88 may be employed as illustrated in FIG. 8. Thus, the rail fastening system illustrated in FIGS. 1–3, 7 and 8 secures the rail to the tie plate which is secured to the wear plate and tubular members by means of the teeth of the wear plate 18 being bonded to the tie and the tubular members being additionally embedded in the tie and maintained therein by the plurality of spaced-apart teeth 40 and further by the horizontally disposed bolt members 82.

Figure 9:
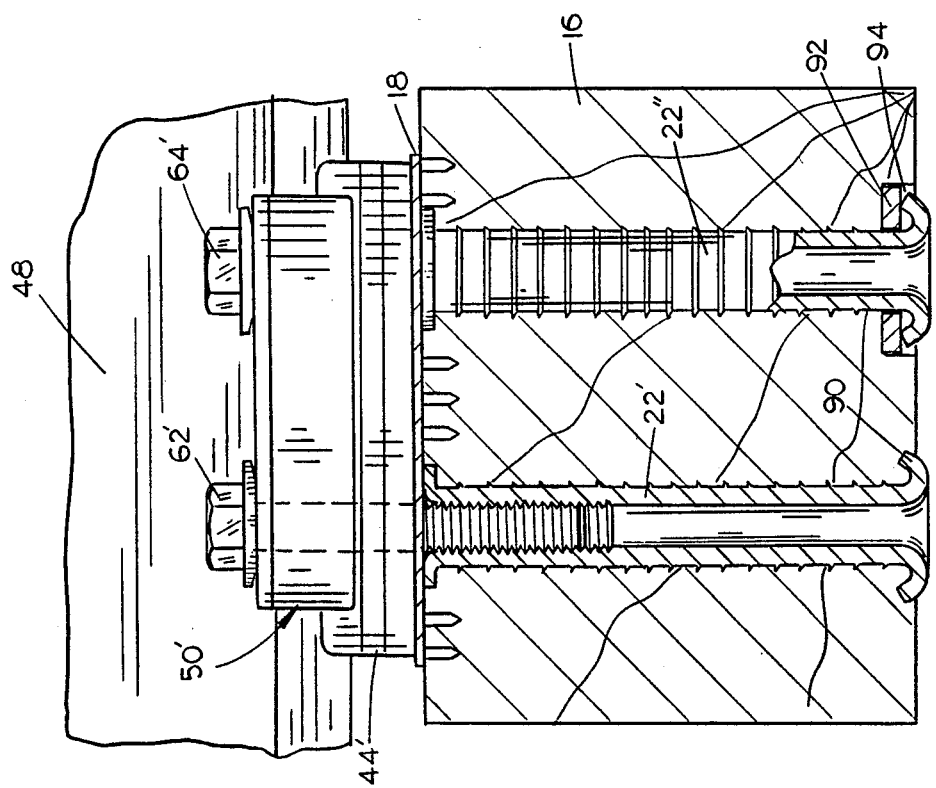
FIG. 9 is a sectional view illustrating the embodiment of FIGS. 4 and 5 being employed.

FIGS. 4 and 9 illustrate a further embodiment or means for further securing the tubular members to the tie. In FIG. 9, it can be seen that the lower ends of the tubular members 22, are notched to form teeth 90 which are then rolled outwardly and upwardly and driven into the bottom surface of the tie. Bolt 62' is threadably secured to tubular member 22, as shown.

FIGS. 5 and 9 illustrate a further modification of the invention and which is quite similar to the embodiment of FIG. 4 except that the lower end of the tubular member 22' is not notched to form teeth. In the embodiment of FIGS. 5 and 9, a support washer 92 is mounted in a countersunk opening 94 with the lower end of the tubular members being rolled outwardly and upwardly into engagement with the washer 92.

Figure 10:
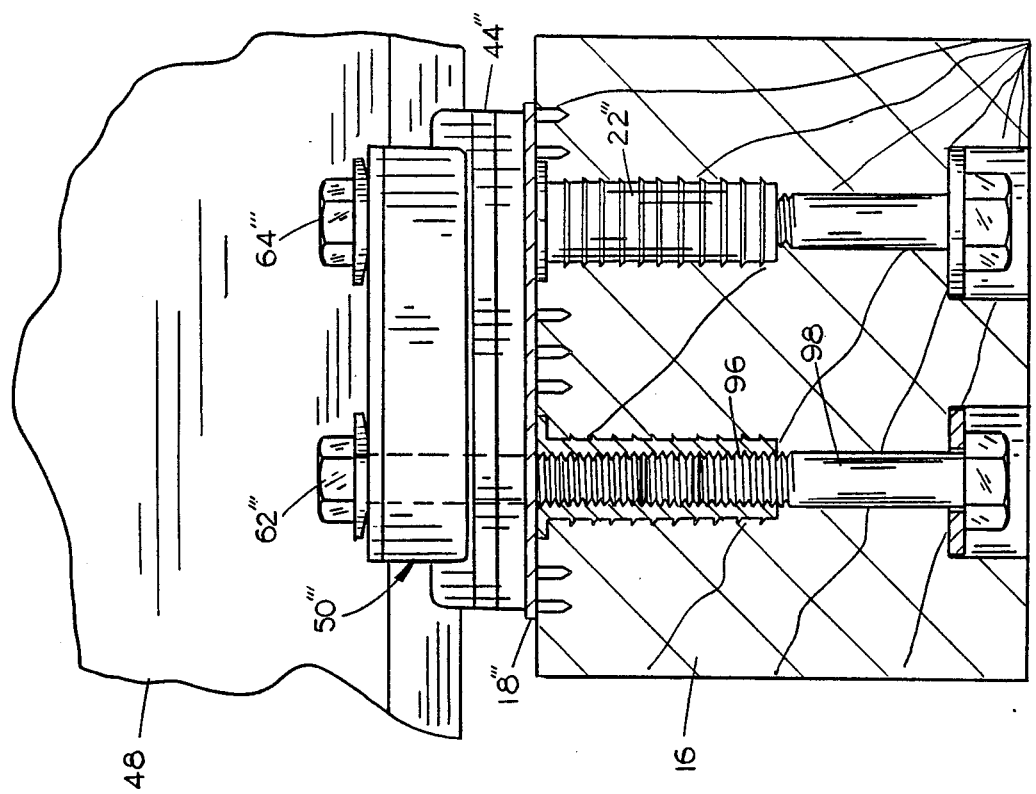
FIG. 10 is a sectional view illustrating the embodiment of FIG. 6 being employed.

FIGS. 6 and 10, yet another embodiment is illustrated. In FIGS. 6 and 10, the tubular members 22''' are also provided with internally threaded portions at their lower ends referred to generally by the reference numeral 96. Bolt members 98 are extended upwardly through the bottom of the tie and are threadably received by the internally threaded portions 96 on the tubular members 22'''. Bolt members 62''' and 64''' are threadably received by the upper ends of tubular members 22''' as illustrated in the drawings.

Figure 11:
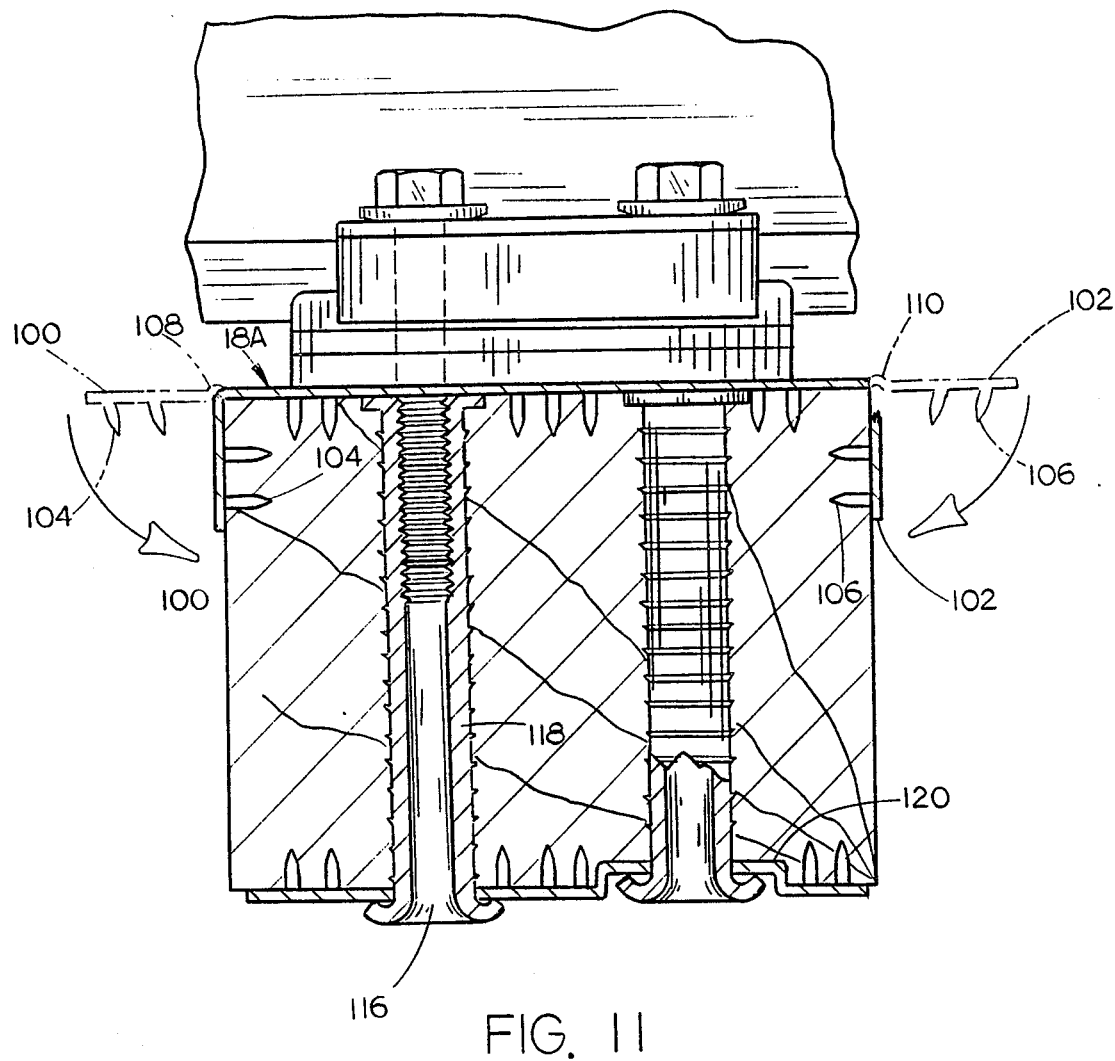
FIG. 11 is a sectional view illustrating a modified form of the top wear plate and a bottom wear plate.

In FIG. 11, wear plate 18A is provided which has wing portions or sides 100 and 102 provided thereon. The wing portions 100 and 102 have teeth 104 and 106 respectively which are set at an angle with respect to the wing portion to enable the wing portions 100 and 102 to be driven into the side of the tie as illustrated in FIG. 11. After the plate 18A has been pressed into the to surface of the tie, a special press is used to bend the plate at the pre-bend form lines 108 and 110, bending the plate over 90° and seating into the side surface of the tie. After the plate has been seated in the top surface and the side surfaces of the tie, a much more improved vertical force resistance is provided and also helps to prevent the wood from checking on the side of the tie as well as the top surface of the tie.

FIG. 11 also illustrates the bottom wear plate 112 having a plurality of teeth 114 struck therefrom which are driven upwardly into the tie to seat the plate 112 on the bottom of the tie. Plate 112 is provided with pre-drilled openings 116 formed therein to permit the anchoring tubes 118 to pass therethrough and then be flared over a stabilizing tube and adding strength to the pull-out resistance of the bolt. The lower right hand portion of FIG. 11 illustrates that the bottom wear plate 112 could have a stamped-in recess 120 to allow for a flush fit on the tie surface. The bottom wear plate will improve the wearing ability of the tie and will serve to slow down the deterioration and decay process thereof.

Thus is can be seen the a novel means has been provided which accomplishes at least all of its stated objectives.

I claim:
1. In combination,
an elongated, substantially horizontally disposed wood cross tie having opposite ends,
a horizontally disposed wear plate having upper and lower surfaces mounted on the upper surface of said cross tie adjacent each end thereof, each of said wear plates being bonded to the tie by means of a plurality of teeth distributed across the entire lower surface of said plate and extending downwardly therefrom, said teeth being embedded in the tie, said cross tie having a plurality of vertically disposed openings formed therein beneath each of said wear plates, each of said wear plates having a plurality of openings formed therein which register with the vertically disposed openings in said tie, said wear plate having a plurality of tubular members secured thereto extending downwardly therefrom into the openings in said cross tie, means securing said tubular members to said tie, said tubular members having an internally threaded portion adjacent the upper end thereof adapted to threadably receive a bolt member, a tie plate positioned on each of said wear plates adapted to support a rail thereon, each of said tie plates having openings formed therein which register with said tubular members, bolt members extending downwardly through the openings in said tie plate and being threadably received by the threaded portions of said tubular members, and means for securing the rails to said tie plates.

2. The combination of claim 1 wherein said means securing said tubular members to said tie comprises at least one bolt means which extends horizontally through the tie beneath said wear plate and extending through one of said tubular members.

3. The combination of claim 2 wherein said means securing said tubular members to said tie comprises a plurality of vertically spaced teeth on the exterior of said tubular members which are embedded in the tie.

4. The combination of claim 1 wherein said tubular members extend completely through said tie and have their lower ends expended outwardly into engagement with said tie.

5. The combination of claim 4 wherein a metal washer means is positioned between the expanded portion of the tubular member and the tie.

6. The combination of claim 1 wherein the lower ends to said tubular members are also provided with internally threaded portions, and wherein said means for securing said tubular members to said tie comprises bolt members extending upwardly into said tie from the bottom thereof which are threadably received by the internally threaded portions at the lower ends of said tubular members.

7. The combination of claim 1 wherein said means securing the rails to said tie plates comprises a pair of hold-down plates positioned on each side of the associated rail and means securing each of said hold-down plates to said wear plates.

8. The combination of claim 7 wherein said means securing each of said hold-down plates to said wear plate comprises bolt members extending downwardly through said hold-down plate, tie plate and into said tubular members.

9. The combination of claim 3, wherein said vertically-spaced teeth on said tubular members are annular rings protecting outwardly therefrom.

10. The combination of claim 1, wherein said plurality of teeth includes at least enough teeth so as to require at least 25,000 pounds of pressure to embed the teeth in the tie.

11. The combination of claim 7 wherein said hold-down plates include a horizontal leg securing said rail, and a vertical leg abutting said tie plate, and further comprising at least one downwardly projecting tip mounted on said hold-down plate horizontal leg, said tip located to secure said rail under said hold-down plate.

* * * * *